United States Patent
West et al.

(10) Patent No.: US 7,501,456 B2
(45) Date of Patent: Mar. 10, 2009

(54) PROCESS FOR PREPARING LIQUID HYDROCARBONS

(75) Inventors: David James West, Ducklington (GB); Michael Joseph Bowe, Preston (GB)

(73) Assignee: CompactGTL PLC, Abingdon (GB)

( * ) Notice: Subject to any disclaimer, the term of this patent is extended or adjusted under 35 U.S.C. 154(b) by 0 days.

(21) Appl. No.: 11/740,880

(22) Filed: Apr. 26, 2007

(65) Prior Publication Data
US 2007/0254967 A1    Nov. 1, 2007

(30) Foreign Application Priority Data
Apr. 27, 2006    (GB)    ................... 0608277.0

(51) Int. Cl.
C07C 27/00    (2006.01)
(52) U.S. Cl. .................. 518/705; 518/700; 518/702; 518/703; 518/704
(58) Field of Classification Search ............ 518/700, 518/702, 703, 705, 704
See application file for complete search history.

(56) References Cited

U.S. PATENT DOCUMENTS

| 5,595,833 | A | 1/1997 | Gardner et al. |
| 7,300,635 | B2 | 11/2007 | Bowe et al. |
| 2005/0171217 | A1* | 8/2005 | Bowe et al. .................. 518/703 |

FOREIGN PATENT DOCUMENTS

| EP | 0936182 | 8/1999 |
| EP | 151663 | 3/2005 |
| JP | 4164802 | 6/1992 |
| JP | 4338101 | 11/1992 |
| WO | 0058242 | 10/2000 |
| WO | 03048034 | 6/2003 |
| WO | 03048034 A1 | 6/2003 |

OTHER PUBLICATIONS

English language abstract of JP 4164802.
English language abstract of JP 4338101.
GB Search Report (GB 0608277.0), dated Aug. 30, 2006.
PCT Search Report and Written Opinion (PCT/GB207/050199), dated Apr. 17, 2007.

* cited by examiner

*Primary Examiner*—Jafar Parsa
(74) *Attorney, Agent, or Firm*—Baker Botts, L.L.P.

(57) ABSTRACT

A process for converting methane to higher molecular weight hydrocarbons comprises:
(A) reforming methane by catalytic reaction with steam at elevated temperature to generate carbon monoxide and hydrogen;
(B) subjecting the mixture of carbon monoxide and hydrogen to a Fischer-Tropsch reaction to generate one or more higher molecular weight hydrocarbons and water; and
C) extracting or removing one or more oxygenates from the water.

The oxygenates are either or both: on start-up of the process, catalytically combusted to provide heat for step (A), and replaced at least in part with methane from tail gas from step (B) when the temperature attains or exceeds the combustion temperature of methane; and/or used as a fuel-enhancer for tail gas from step (B) for steady-state heat provision in step (A).

20 Claims, 1 Drawing Sheet

PROCESS FOR PREPARING LIQUID HYDROCARBONS

This invention relates to a process for converting methane to liquid hydrocarbons.

BACKGROUND TO THE INVENTION

WO 03/048034 describes a process in which, in a first stage, methane is reacted with steam in a first catalytic reactor to generate carbon monoxide and hydrogen ("synthesis gas") in a so-called reforming stage, and, in a second stage, the resulting synthesis gas is subjected to a Fischer-Tropsch reaction in a second catalytic reactor to generate hydrocarbons of higher molecular weight and that are usually liquid at ambient temperatures. The overall result is to convert methane gas to liquid hydrocarbons, hence the conversion is sometimes referred to as gas-to-liquid ("GTL").

The above-described conversion is of interest because it enables natural gas occurring at an oil or gas well to be converted into valuable and useful liquid hydrocarbons which are easier to transport.

WO 03/048034 discloses that the reforming stage is an endothermic reaction for which heat may be provided by combustion of methane over a palladium or platinum catalyst. However, methane does not catalytically combust in air until it reaches a temperature of about 400° C. Therefore, in order to start the reforming stage, means must be provided for raising the temperature of the combustion catalyst to about 400° C. or above before introducing methane or natural gas into the reforming reactor. Of the possibilities available, electrical heating may not be practicable on a commercial plant scale, and use of a duct burner in which there is direct contact between a flame and the gas to be heated would generate water which would condense on the cold catalyst and potentially cause damage. The invention overcomes the problem in a surprising and unexpected manner by employing oxygenates generated in the Fischer-Tropsch reaction stage of the conversion. Furthermore, the invention makes use of the oxygenates in the steady-state operation of the combustion process, i.e. after the reforming stage has satisfactorily started.

SUMMARY OF THE INVENTION

The invention provides in one aspect a process for converting methane to higher molecular weight hydrocarbons comprising
(A) reforming methane by catalytic reaction with steam at elevated temperature to generate carbon monoxide and hydrogen;
(B) subjecting the mixture of carbon monoxide and hydrogen to a Fischer-Tropsch reaction to generate one or more higher molecular weight hydrocarbons and water;
(C) extracting or removing one or more oxygenates from the water;
(D) catalytically combusting the oxygenate(s), thereby to provide heat for step (A); and
(E) replacing at least part of the oxygenate(s) in step (A) with methane when or after the temperature of the catalytic combustion attains or exceeds the catalytic combustion initiation temperature of methane.

The methane in step (E) is typically provided in natural gas on start-up of the process, i.e., before a gaseous product of step (B), so-called "tail gas" is generated. Subsequently, the methane in step (E) may be provided in tail gas from step (B).

Preferably, the oxygenate(s) from step (D) are also used as a fuel-enhancer in combination with tail gas generated in step (B) (shorter-chain hydrocarbon gases and hydrogen) to constitute the fuel for steady-state heat provision for step (A).

In a second aspect, the invention provides a process for converting methane to higher molecular weight hydrocarbons comprising
(A) reforming methane by catalytic reaction with steam at elevated temperature to generate carbon monoxide and hydrogen;
(B) subjecting the mixture of carbon monoxide and hydrogen to a Fischer-Tropsch reaction to generate one or more higher molecular weight hydrocarbons and water;
(C) extracting or removing one or more oxygenates from the water; and
(F) using the oxygenate(s) from step (C) as a fuel enhancer in combination with shorter-chain hydrocarbon gases and hydrogen ("tail gas") generated in step (B) as the fuel for steady-state heat provision for step (A).

Preferably, in the second aspect, in step (F), the oxygenate(s) from step (C) are catalytically combusted to provide heat for step (A) (corresponding to step (D) of the first aspect); and
(G) they are replaced at least in part with methane when or after the temperature of the catalytic combustion attains or exceeds the catalytic combustion initiation temperature of methane (corresponding to step (E) of the first aspect). This is to enable the process to start, referred to as "start-up".

It should be noted that, in both aspects, provision of heat for step (A) does not necessarily mean that all of the heat for step (A) is provided in step (D) or step (F). Thus, part only of the heat may be so provided.

In both aspects of the invention if and when appropriate, it is preferred that the catalytic combustion of step (D) and step (F) takes place in air that, more preferably, is pre-heated indirectly by heat exchange with coolant used in step (B). This catalytic combustion takes place heterogeneously.

By "oxygenate" is meant an organic chemical compound whose molecular structure contains oxygen in addition to carbon and hydrogen. As examples of oxygenates in this invention there may be mentioned methanol and ethanol, which predominate, and, present in trace amounts, other alcohols, aldehydes and ketones having up to nine carbon atoms per molecule. WO 03/048034 mentions that the water from the Fischer-Tropsch reaction may contain alcohols and that the alcohols will, under stated circumstances, be reformed to produce CO, CO2 and H2. It does not describe or suggest their use in the combustion process.

DETAILED DESCRIPTION OF THE INVENTION

Figure 1:
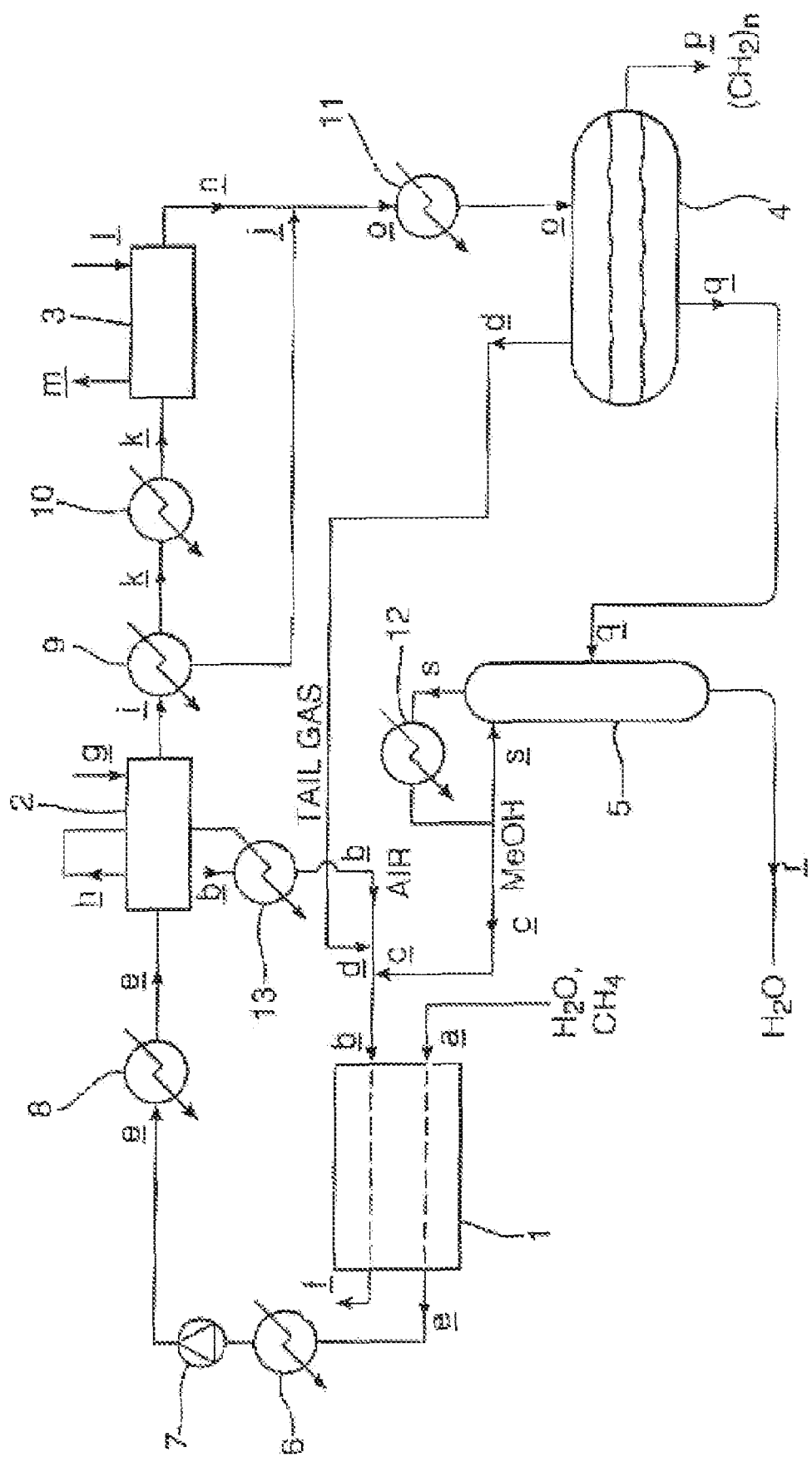
FIG. 1 shows a flow diagram of a conversion process of the invention.

In step (C), the oxygenate(s), typically including methanol, may be removed from the water by distilling it from the aqueous phase of the Fischer-Tropsch reaction product from step (8) and by pumping it in liquid form to a vaporizer. It is then vaporised, e.g. by indirect warming using coolant from step (8). Alternatively, the oxygenate(s) may be removed from the distillation process directly in vapour form and maintained in the vapour phase to the combustion process by use of trace-heated pipework, i.e. pipework heated by an external heat source.

In step (D) or (F), cold combustion air may be indirectly heated, via a heat exchanger, using a coolant from step (B); on "start-up", the coolant from step (B) may be heated by a gas-fired boiler. The coolant is typically heated to about 200°

C. by the exotherm of the Fischer-Tropsch reaction (step (B)) or the start-up boiler, so that it has the capacity to heat the combustion air above the catalytic combustion initiation or "light-off" temperature for methanol (~80° C.).

When combustion air has heated the combustion catalyst in step (D) to above 80° C., which is around the initiation temperature for the catalytic combustion of methanol, methanol vapour, as the oxygenate, is introduced in combination with pre-heated combustion air. Catalytic combustion of methanol is thereby initiated. In this way, and because the combustion air is indirectly heated, no water is generated which could condense on the catalyst or the walls of the combustion reactor for step (D) when starting up the combustion reactor from cold. It should be noted that if a direct-fired duct heater were used to initially heat the combustion air, water vapour/carbonic acid would condense on the cold catalyst producing corrosive conditions. A corrosive environment is avoided by using indirect heating of the combustion air. Once the temperature of the combustion catalyst has reached approximately 80° C., methanol vapour is introduced with the combustion air and the catalytic combustion of the methanol causes the temperature of the catalyst to rise. When it exceeds about 400° C., which is the catalytic initiation temperature for methane combustion, methane may be introduced and the methanol use reduced until, eventually, use of methane can replace use of methanol.

U.S. Pat. No. 5,595,833 describes, in column 10 in the context of starting up a solid oxide fuel cell, use of the exothermic partial oxidation of methanol to warm up a prereformer, supply of hydrocarbon fuel when the pre reformer reaches a temperature of approximately 500° C., and termination of methanol supply.

Clearly, the process of this invention requires a separate source of oxygenate for it to be initiated. Thereafter, oxygenate is generated in step (B) and some stored for future start-up purposes, and oxygenate from the separate source becomes unnecessary. After sufficient oxygenate has been generated and stored (containing e.g. 50 wt % or more of methanol), further oxygenate production from the Fischer-Tropsch reaction (step (B)) can be used as a steady-state catalytic combustion fuel supplement, thus improving overall carbon conversion efficiency. Subject to the above requirement, the process has the advantage of limited need for oxygenate storage and handling facilities as the oxygenate produced in the process can be utilized as fuel. In this way, the operating environment is improved and start-up of the process is simplified.

In the preferred embodiment of the invention, "tail gas" from step (B), which may for example include hydrocarbons having from one to eight carbon atoms per molecule such as methane, is typically fed to the combustion side of the reformer reactor used in step (A) together with hot pre-heated combustion air. Vaporized oxygenates from step (B) are used as a supplementary fuel to the tail gas. Thus, less tail gas is consumed in catalytic combustion and more of it can be used as a supplementary fuel for example to drive gas turbine compressors to achieve a pressure suitable for step (B). Therefore, less natural gas is used to drive gas turbine compressors giving rise to improved carbon conversion efficiency.

By combusting oxygenates and as indicated above, overall thermal efficiency is improved and the need for oxygenate storage and handling facilities is considerably reduced.

A further advantage of the invention is that the oxygenate (methanol etc) is a low sulphur fuel. There is therefore little risk of poisoning the combustion catalyst in the practice of the invention.

AN EXAMPLE OF THE INVENTION

The invention will now be further and more particularly described, by way of example only, with reference to the accompanying drawing in which:

FIG. 1 shows a flow diagram of a conversion process of the invention.

The invention is of relevance to a chemical process for converting natural gas (primarily methane) to longer chain hydrocarbons. The first stage of this process involves steam reforming, that is to say the reaction of the type:

$$H_2O + CH_4 \rightarrow CO + 3H_2$$

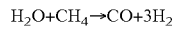

This reaction is endothermic, and may be catalyzed by a rhodium or platinum/rhodium catalyst in a first gas flow channel. The heat required to cause this reaction is provided by combustion of an inflammable gas, which is exothermic and may be catalysted by a palladium catalyst in an adjacent second gas flow channel. In both cases the catalyst is preferably on a stabilized-alumina support which forms a coating typically less than 100 microns thick on the metallic substrate. The combustion reaction may take place at atmospheric pressure, but the reforming reaction may take place at between 2 and 5 atmospheres. The heat generated by the combustion would be conducted through the metal sheet separating the adjacent channels.

The "synthesis" gas mixture produced by the steam/methane reforming is then used to perform a Fischer-Tropsch synthesis to generate longer chain hydrocarbons, that is to say by the following reaction:

$$nCO + 2nH_2 \rightarrow (CH_2)n + nH_2O$$

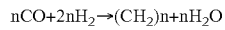

which is an exothermic reaction occurring at an elevated temperature, typically between 190° C. and 280° C., and an elevated pressure, typically between 1.8 MPa and 4.0 MPa (absolute values), in the presence of a catalyst.

Referring to FIG. 1, the following plant components are shown:

a reformer 1 for carrying out step (A) of the invention in the form of a compact catalytic reactor made from a stack of plates which define flow paths for endothermic and exothermic reactions which are in good thermal contact, and which contain appropriate catalysts for example on corrugated metal foils. The reformer 1 has reformer channels (not shown) containing a reforming catalyst for the reaction of steam and methane to form carbon monoxide and hydrogen. The reformer 1 also has adjacent combustion channels (not shown) carrying a combustion catalyst for a combustion reaction to generate heat for the reforming reaction (step (A) of the invention). The combustion catalyst may include gamma alumina as a support, coated with a palladium/platinum mixture;

two Fischer-Tropsch reactors 2 and 3 for carrying out step (B) of the invention. The Fischer-Tropsch reactors 2 and 3 each contain a catalyst for the FischerTropsch reaction, and define channels for coolant. The catalyst may for example be iron, cobalt or fused magnetite. Preferably, it comprises a coating of gamma-alumina of specific surface area 140 to 230 $m^2g^{-1}$ with about 10 to 40 mass % cobalt, based on the mass of alumina, and with less than 10 mass % of the mass of cobalt of a promoter such as ruthenium, platinum or gadolinium, and a basicity promoter such as lanthanum oxide;

a separator chamber 4 for separating the three phases from the Fischer-Tropsch reactors 2 and 3, namely an aqueous phase, hydrocarbons in an oil phase and tail gas in a gaseous phase, and for stabilising the hydrocarbons at atmospheric pressure; and a distillation column 5 for separating oxygenates from the aqueous phase issuing from the separator chamber 4.

Other plant components are shown in FIG. 1 and will be referred to in the following description of the operation of the plant flow diagram shown in FIG. 1.

A mixture of steam and natural gas (primarily methane) is fed into the reformer channels of the reformer 1 as shown by arrow a. Upon initial start up, combustion air, pre-heated to a temperature of above about 100° C. using boiler heated coolant fluid from the Fischer-Tropsch reactor 2 as described below, is fed into the combustion channels of the reformer 1 as shown by arrows b initially without fuel so that the reformer 1 can be pre-heated to avoid water combustion product condensing on the cold surfaces and producing corrosive conditions and to heat the catalyst above the "light-off" temperature for the catalytic combustion of methanol; then, after sufficient pre-heating is achieved, it is fed into the combustion channels in combination with oxygenate vapour (primarily methanol) as shown by arrows c for the oxygenate. The methanol in the oxygenate combusts to generate heat for the steam and methane to react in a reforming reaction to form carbon monoxide and hydrogen ("synthesis gas"). When the reforming reaction and the Fischer-Tropsch reaction have been initiated, tail gas is introduced into the reformer 1, as a combustion fuel, in combination with air and oxygenate as shown by arrow d so that the reforming reaction may continue. The methane component of the tail gas cannot catalytically combust until the temperature in the combustion channels exceeds 400° C.

Synthesis gas emerges from the reformer channels of the reformer 1 at a temperature of about 820° C. as shown by first arrow e, and exhaust gases emerge from the combustion channels of reformer 1 as shown by arrow f. The synthesis gas is passed through a cooler 6 and compressor 7, at which stage its temperature is about 150° C. and its pressure is about 20-40 bar gauge. The synthesis gas is then passed through a pre-heater 8 to raise its temperature to about 210° C. and is then fed into the first Fischer-Tropsch reactor 2. The flow of synthesis gas from the reformer 1 to the first FischerTropsch reactor 2 is shown by arrows e.

The first Fischer-Tropsch reactor 2 is cooled by a coolant whose entry and exit are shown by arrows g and h respectively. Heated coolant from the first FischerTropsch reactor 2 is passed through a heat exchanger 13 to pre-heat the air entering the reformer 1 as shown by arrows b as described above. Part of the synthesis gas is converted in the first Fischer-Tropsch reactor 2 to a product that is predominantly water and longer chain hydrocarbons. The emerging product is passed through a condenser 9 as shown by arrow i. Water and longer chain hydrocarbons which condense then exit the condenser 9 as shown by arrow i, and unreacted synthesis gas exits the condenser 9 at a temperature of about 80° C. as shown by first arrow k. The unreacted synthesis gas is passed into a pre-heater 10 to raise its temperature to about 210° C. and thence into the second Fischer-Tropsch reactor 3 as shown by further arrow k.

The second Fischer-Tropsch reactor 3 is cooled by a coolant whose entry and exit are shown by arrows 1 and m respectively. The synthesis gas is converted to further product, predominantly water and longer chain hydrocarbons, in the second Fischer-Tropsch reactor 3, which emerges therefrom as shown by arrow n to be consolidated with corresponding product emerging from the first Fischer-Tropsch reactor 2 as shown by arrow j.

The consolidated product is passed through a condenser 11 as shown by arrow o, where it emerges at a temperature of about 80° C. to enter the separator chamber 4, as shown by further arrow o, to form three phases: an aqueous phase, an oil phase and a gaseous phase.

The oil phase contains potentially useful higher molecular weight hydrocarbons (e.g. including paraffinic $C_9$ to $C_{12}$ hydrocarbons) and is removed from the separator chamber 4 as shown by arrow p.

The gaseous phase, referred to as "tail gas", contains hydrogen and lower molecular weight hydrocarbons (predominantly methane), and exits the separator chamber 4 as shown by further arrow d to provide a combustion fuel in combination with oxygenate and air, as described above, for the reforming reaction.

The aqueous phase contains water and oxygenates (predominantly methanol) and is passed from the separator chamber 4 to the distillation column 5 as shown by arrows q. The separated oxygenates are vaporised and the water from which oxygenates have been removed exits the distillation column 5 as shown by arrow r to be used for raising steam for use in the reforming stage. Oxygenate exits the distillation column 5 as shown by arrows c to constitute a combustion fuel in combination with air and subsequently with tail gas, as described above, for the reforming reaction. The oxygenate exits the distillation column 5 and is passed through a condenser 12; part of the oxygenate is recycled as a reflux to the distillation column 5 as shown by arrows s.

To commence operation, a separate source of oxygenate needs to be supplied to the reformer 1 as a combustion fuel before oxygenate is generated by operation of the two-stage chemical process described above and becomes available to act as a combustion fuel.

In practice the oxygenate for use as a fuel (arrow c) after being condensed by the condenser 12, may be further cooled and stored in a storage tank (not shown). This storage tank should store enough oxygenate for the start-up procedure. Once this storage tank is full, the subsequently-produced oxygenate can be used as fuel or as a fuel supplement, as indicated by arrow c.

A further advantage of the use of methanol is that it can be supplied as an aqueous solution, and when this is vaporised and supplied into the reformer fuel injection header during normal operations the steam can help prevent the possible thermal cracking of the methane fuel component at temperatures above 800° C., and can help suppress the Boudouard carbon monoxide disproportionation reaction, namely:

$$2CO \rightleftharpoons CO_2 + Carbon,$$

which tends to be favoured in the temperature range 300-700° C. Both these reactions lead to carbon deposition, and can occur if the fuel gas is subjected to high temperatures in the fuel injection headers (which may be within the reforming reactor). Addition of steam into the fuel header can prevent these reactions.

We claim:

1. A process for converting methane to higher molecular weight hydrocarbons comprising:
   (A) reforming methane by catalytic reaction with steam at elevated temperature to generate a mixture comprising carbon monoxide and hydrogen;
   (B) subjecting the mixture of comprising carbon monoxide and hydrogen to a Fischer-Tropsch reaction to generate one or more hydrocarbons and water and to produce a tail gas;

(C) extracting or removing one or more oxygenates that comprise a mixture of at least two oxygenates having up to nine carbon atoms chosen from the group consisting of alcohols, aldehydes, and ketones, from the water;

(D) recycling at least a plurality of the oxygenates to step (A) and catalytically combusting the oxygenate, thereby providing heat for step (A); and (E) replacing at least a portion of the oxygenate(s) in step (D) with methane when or after the temperature of the catalytic combustion attains or exceeds the catalytic combustion initiation temperature of methane.

2. The process as claimed in claim 1 wherein the methane in step (E) is provided in natural gas on start-up of the process and is subsequently replaced at least in part by methane provided in gaseous products from step (B).

3. The process as claimed in claim 1 wherein at least a portion of the oxygenate(s) from step (D) is used as a fuel-enhancer in combination with at least one hydrocarbon gases and hydrogen from the tail gas produced in step (B) as a fuel for steady-state heat provision of step (A).

4. A process for converting methane to higher molecular weight hydrocarbons comprising (A) reforming methane by catalytic reaction with steam at elevated temperature to generate a mixture comprising carbon monoxide and hydrogen;

(B) subjecting the mixture comprising carbon monoxide and hydrogen to a Fischer-Tropsch reaction to generate one or more hydrocarbons and water and to produce a tail gas, the water comprising a plurality of oxygenates that comprise a mixture of at least two oxygenates having up to nine carbon atoms chosen from the group consisting of alcohols, aldehydes, and ketones;

(C) extracting or removing one or more oxygenates from the water; and (F) recycling at least a portion of the oxygenate from step (C) as a fuel-enhancer in combination with hydrocarbons and hydrogen from the tail gas produced in step (B) as a fuel for steady-state heat provision of step (A).

5. The process as claimed in claim 4 wherein, in step (F), the oxygenate(s) from step (C) are: catalytically combusted to provide heat for step (A); and (G) replaced at least in part with methane when or after the temperature of the catalytic combustion attains or exceeds the catalytic combustion initiation temperature of methane.

6. The process as claimed in claim 1 wherein a coolant is used in step (B) and in step (D), combustion takes place in air pre-heated indirectly by heat exchange with the coolant used in step (B).

7. The process as claimed in claim 4 wherein a coolant is used in step (B) and in step (F), combustion takes place in air pre-heated indirectly by heat exchange with the coolant used in step (B).

8. The process as claimed in claim 1 wherein the methane in step (A) is provided in natural gas.

9. The process as claimed in claim 4 wherein the methane in step (A) is provided in natural gas.

10. The process as claimed in claim 1 wherein at least part of the water produced in step (B) is employed to generate steam for use in step (A).

11. The process as claimed in claim 1 wherein at least a portion of the methane in step (A) is provided from a tail gas from step (B).

12. The process as claimed in claim 1 wherein the oxygenates comprise methanol and ethanol.

13. The process as claimed in claim 4 wherein the oxygenates comprise methanol and ethanol.

14. The process as claimed in claim 1 wherein, in step (D), the oxygenates are provided for combustion in the form of an aqueous solution.

15. The process as claimed in claim 4 wherein, in step (F), the oxygenates are provided for combustion in the form of an aqueous solution.

16. The process as claimed in claim 1 wherein the oxygenates are in vapour form.

17. A process comprising:

reforming methane by a catalytic reaction with at least a combustion catalyst and steam at elevated temperature to generate a mixture comprising carbon monoxide and hydrogen, the elevated temperature being produced by a combustion step using a combustion catalyst;

subjecting the mixture comprising carbon monoxide and hydrogen to a Fischer-Tropsch reaction to generate one or more hydrocarbons and water, the water comprising oxygenates that comprise a mixture of at least two oxygenates having up to nine carbon atoms chosen from the group consisting of alcohols, aldehydes, and ketones;

extracting or removing at least one of the oxygenates from the water;

recycling and combusting at least a portion of the oxygenates so as to provide at least a portion of fuel needed for the step of reforming methane by catalytic reaction; and replacing at least a portion of the oxygenates with methane when or after a temperature in the combusting step attains or exceeds the catalytic combustion temperature of methane.

18. The process as claimed in claim 1 wherein the combustion catalyst is heated to a temperature of 80° C. before the oxygenates are combusted to provide fuel for the step of reforming methane by catalytic reaction.

19. A process comprising:

reforming methane by a catalytic reaction with at least a combustion catalyst and steam at elevated temperature to generate a mixture comprising carbon monoxide and hydrogen, the elevated temperature being produced by a combustion step using a combustion catalyst;

subjecting the mixture comprising carbon monoxide and hydrogen to a Fischer-Tropsch reaction to generate one or more hydrocarbons and water, the water comprising oxygenates that comprise a mixture of at least two oxygenates having up to nine carbon atoms chosen from the group consisting of alcohols, aldehydes, and ketones;

extracting or removing at least one of the oxygenates from the water; and forming a fuel mixture comprising at least a portion of the oxygenates, at least one of the hydrocarbons and hydrogen; and using the fuel mixture as at least a portion of the fuel in the combustion step.

20. The process as claimed in claim 1 wherein the combustion catalyst is heated to a temperature of 80° C. before the oxygenates are combusted to provide fuel for the step of reforming methane by catalytic reaction.

* * * * *